July 12, 1966
K. LUTZ
3,260,110
INDICATOR FOR FLOW METERS WITH FLOATS
Filed March 25, 1964
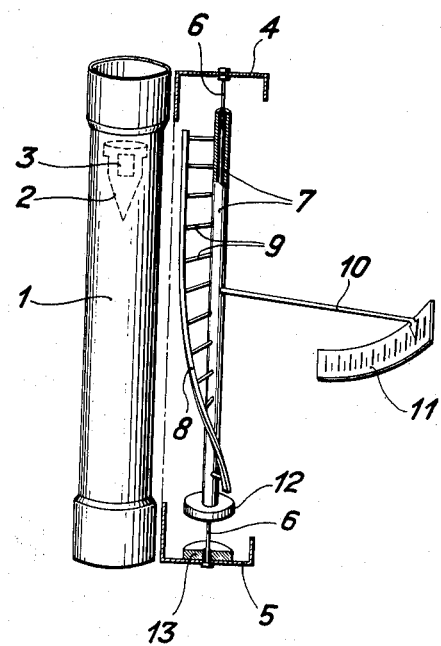
Inventor:
Kurt Lutz
By
Western & Western

United States Patent Office 3,260,110
Patented July 12, 1966

3,260,110
INDICATOR FOR FLOW METERS WITH FLOATS
Kurt Lutz, Wurttemberg, Baden, Germany, assignor to Rota, Apparate- und Maschinenbau Dr. Hennig KG., Oflingen, Baden, Germany
Filed Mar. 25, 1964, Ser. No. 354,632
5 Claims. (Cl. 73—209)

The invention relates to an indicator device for flow meters equipped with a floating body. More particularly, it relates to an indicator which avails itself of a magnet to minimize friction.

In flow meters which are equipped with floating bodies the float usually operates in a vertical measuring tube having a continuously changing cross section, e.g., a conical shape or conical ribs or slots.

The float, in dependence on the variable flow of the traversing medium, occupies its position in different heights conditioned by the corresponding cross section. This height is observed and read through the transparent measuring tube. However, in many instances, especially in the case of dark media or upon fouling of the measuring tube, reading becomes difficult if not impossible when a remote indicator is not present.

It also is known to show the position of the float at an outer indicator by mechanical, inductive or magnetic linkages. For such purposes, a helix or spiral, disposed parallel to the axis or the measuring tube and provided with a magnetic linkage to the float, is known. The upward and downward movement of the float thereby is transformed into a rotatory motion by lateral displacement of the helix and indicated by a pointer, affixed thereto, on a scale. By means of auxiliary devices, remote indication or remote control can be effected.

Albeit such arrangements do not have any adverse effect upon the mobility of the float due to the magnetic linkage, considerable inaccuracies of the indicator nevertheless are encountered which are caused by the friction of the helix or spiral on its axis caused by its seating. Seating of the helix in bearings, e.g., in precious stones, is not only expensive, but increases the sensitivity without, however, sufficiently minimizing or eliminating the drawbacks caused by the friction.

According to the invention these disadvantages are removed in such a manner that the axis of the helix or spiral is held in suspension by means of magnetic force and is kept rotatory without friction in its working position. For this purpose, the axis of the helix is hollow and is disposed freely slidably on a fine tension wire traversing said axis. This axis carries at its lower end a magnet, preferably in the form of a disc whose frontal surface is directed toward the frontal surface of a second magnet of like polarity which is fixedly disposed below the first one on the mounting. By means of the counteracting magnetic forces, the axis sits, freely suspended, on a magnetic cushion without mechanical contact. The rotatory movement can take place without any mechanical friction. The friction of the helix arrangement caused by the surrounding air is negligible because the speed of rotation is zero when the value to be measured is attained.

As magnetic material preferably sintered metal is used which can be manufactured in any desired shape and with any desired polarity and can readily be fabricated and machined. Such a seating is extremely insensitive since, upon shock or impact, no delicate bearings or seating parts can be damaged. The device can easily be transported and manipulated. After installation in the proper position, the frictionless seating of the helix or spiral facilitates automatic adjustment. Not only is this device simple and inexpensive, but it has the particular advantage that it can be employed as a universally interchangeable instrument due to the slight adjusting power to be exerted by the float. The device can be built separately and can be used selectively for different flow meters. It is evident that the device also can be constructed in a known manner as remote indicator or remote control.

According to a further embodiment of the invention, magnet pairs also can be provided at the upper end of the axis of the helix which, by corresponding polarity, offset the weight of the helix thus removing the seating friction. Thereby the helix can be kept in a stable equilibrium in lieu of the unstable, or labile, equilibrium mentioned above.

The sliding guidance on the fine wire has no disturbing influence in practice especially since centering can be effected by suitable formation of the magnets. For this purpose, the magnets are formed so that they have active field areas of like shape. Furthermore, the magnet pairs may be provided with interlocking surfaces. For instance, the immovable magnet may have an overlapping shape of a shell, e.g., like a bearing sleeve, so that, aside from co-action of the two magnetic fields depending on the distance, a universal radial action is exerted to hold the axis in median position. Under certain conditions the tension wire can even be omitted entirely.

The invention now will be further illustrated with reference to the accompanying drawing. However, it should be understood that this is given merely by way of explanation, not of limitation, and that many changes may be made in the details without departing from the spirit and the scope of the invention as hereinafter claimed.

The drawing is a diagrammatical view of the device.

Referring now to the drawing:

The measuring tube 1 carries on its inside float 2 in which a magnet 3 is embedded for the purpose of magnetic linkage. Between the upper housing part 4 and the lower housing part 5 a fine wire 6 is stretched on which the hollow axis 7 of spiral or helix 8 is slidably disposed. Helix 8 preferably is made of soft iron to facilitate linkage with magnet 3 and is fastened to axis 7 by means of fine ribs 9. A pointer 10 is fastened to axis 7 and moves across a scale 11. At the lower end of axis 7, a magnetic disc 12 is disposed, provided with a central opening for passage of wire 6. At the lower housing part 5, magnet 13, also provided with a central hole for the passage of wire 6, is affixed. The frontal areas of the two magnets, facing each other, have like polarity so that the slidable axis 7, so to speak, rests on an invisible cushion without mechanical contact and thus is held freely rotatably.

According to a special embodiment, the housing, represented in the drawing by its parts 4 and 5, respectively, is not connected to the housing of the flow meter itself, but is separate therefrom and can be affixed to any flow meter and detached therefrom.

I claim as my invention:

1. An indicator for flow meters composed of a housing, a float disposed therein, and an indicator linked to said float, said indicator comprising, in combination, a cylindrical indicator housing: a fine wire suspended vertically and substantially centrally therein; a helix rotatably disposed in said indicator housing provided with a hollow axis enveloping said fine wire, said helix being connected to said axis by a plurality of fine ribs; a first magnetic disc having a central aperture for passage of said wire disposed at the lower end of said axis; a second magnetic disc also having a central aperture for passage of said wire disposed at the bottom of said indicator housing; the areas of said magnetic discs facing each other being of like polarity thus holding said helix in a freely rotatable manner without mechanical contact and thereby eliminating friction; a pointer attached to said helix; and scale means opposite the end of said pointer to ascertain the flow to be measured.

2. The indicator as defined in claim 1, wherein said indicator housing is detachable from said flow meter and attachable to any flow meter of similar construction.

3. An indicator for flow meters composed of a housing of substantially cylindrical outer shape, a float disposed therein, and an indicator magnetically linked to said float, said indicator comprising, in combination, a cylindrical indicator housng of substantially like length as said flow meter housing; a fine wire vertically and substantially centrally suspended in said indicator housing; a helix rotatably disposed in said housing having a hollow axis enveloping said wire, said helix being connected to said axis by a plurality of fine ribs; a first magnetic disc having a central aperture for passage of said wire disposed at the lower end of said axis; a second magnetic disc of substantially like size as said first magnetic disc fixedly disposed at the bottom of said indicator housing opposite said first magnetic disc, said second disc also having a central aperture for passage of said wire; the areas of said magnetic discs facing each other being of like polarity thus holding said helix in a freely rotatable manner, without mechanical contact, and thereby eliminating friction; a pointer attached to said helix; and scale means opposite the end of said pointer to ascertain the flow to be measured.

4. In a flow meter composed of a flow meter housing, a float disposed therein, an indicator housing adjacent to said meter housing, a helix disposed therein and linked magnetically to said float, and pointer and scale means to ascertain the flow to be measured, the improvements which comprise, in combination, a fine wire substantially centrally and vertically suspended in said indicator housing; said helix having a hollow axis and being connected thereto by a plurality of fine ribs, said axis enveloping said wire; a first magnetic disc disposed at the lower end of said disc and having a central aperture for passage of said wire; a second magnetic disc opposite said first magnetic disc fixedly disposed at the bottom of said indicator housing, also provided with a central aperture for passage of said wire; the areas of said magnetic discs facing each other having like polarity thus holding said helix in vertical position in a freely rotatable manner without mechanical contact and thereby eliminating friction.

5. In a flow meter composed of a flow meter housing, a float disposed therein, an indicator housing adjacent to said flow meter housing, a helix disposed therein and magnetically linked to said float, and pointer and scale means for ascertaining the flow to be measured, the improvements which comprise, in combination, a fine wire vertically and substantially central suspended in said indicator housing; said helix vertically extending through said indicator housing, ending near the upper and lower ends of said indicator housing and having a hollow axis; said helix being connected to said axis by a plurality of fine ribs; said axis enveloping said fine wire; a first magnetic disc disposed at the lower end of said axis and provided with a central aperture for passage of said wire; a second magnetic disc of substantially like size as said first disc fixedly disposed at the inside bottom of said indicator housing opposite said first disc, said second disc also having a central aperture for passage of said wire; the areas of said magnetic discs facing each other being of like polarity thus holding said helix in a freely rotatable manner without mechanical contact and thereby eliminating friction; said indicator housing being detachable from said flow meter housing and attachable to any flow meter of similar construction.

References Cited by the Examiner

UNITED STATES PATENTS

| 658,814 | 11/1900 | Stanley et al. | 308—10 |
| 2,713,523 | 7/1955 | Medicus | 308—10 |
| 3,065,635 | 11/1962 | Keller | 73—319 |

FOREIGN PATENTS

| 1,054,246 | 4/1959 | Germany. | |

RICHARD C. QUEISSER, *Primary Examiner.*